US012382222B2

(12) United States Patent
Goupy et al.

(10) Patent No.: US 12,382,222 B2
(45) Date of Patent: Aug. 5, 2025

(54) METHOD FOR MANAGING A PLURALITY OF MULTIMEDIA COMMUNICATION LINKS IN A POINT-TO-MULTIPOINT BLUETOOTH NETWORK

(71) Applicant: Google LLC, Mountain View, CA (US)

(72) Inventors: Julien Goupy, Le Mesnil-Saint-Denis (FR); Thomas Girardier, Bourg la Reine (FR); Nicolas Guezellot Prudhomme, Paris (FR)

(73) Assignee: GOOGLE LLC, Mountain View, CA (US)

( * ) Notice: Subject to any disclaimer, the term of this patent is extended or adjusted under 35 U.S.C. 154(b) by 0 days.

(21) Appl. No.: 18/530,769

(22) Filed: Dec. 6, 2023

(65) Prior Publication Data

US 2024/0114290 A1      Apr. 4, 2024

Related U.S. Application Data

(63) Continuation of application No. 17/607,304, filed as application No. PCT/EP2020/070870 on Jul. 23, 2020, now Pat. No. 11,889,281.

(30) Foreign Application Priority Data

Jul. 26, 2019      (EP) .................................... 19315077

(51) Int. Cl.
*H04R 3/12*      (2006.01)
*G10L 19/16*      (2013.01)
(Continued)

(52) U.S. Cl.
CPC .............. *H04R 3/12* (2013.01); *G10L 19/167* (2013.01); *G10L 19/22* (2013.01); *H04W 72/30* (2023.01);
(Continued)

(58) Field of Classification Search
None
See application file for complete search history.

(56) References Cited

U.S. PATENT DOCUMENTS 7,218,644 B1 *      5/2007      Heinonen ............... H04W 8/04
                                                                370/468
7,706,282 B2 *      4/2010      Huang ................... H04L 45/125
                                                                370/252
(Continued)

FOREIGN PATENT DOCUMENTS

CN      105027531      11/2015
CN      109661828      4/2019
EP      171821234 A2      8/2007

*Primary Examiner* — Paul W Huber
(74) *Attorney, Agent, or Firm* — DORITY & MANNING, P.A.

(57)      ABSTRACT

Various arrangements for managing a plurality of multimedia communication links in a point-to-multipoint Bluetooth network established between a source device and a plurality of sink devices are presented. An initial set of values of configuration parameters respectively related to each sink device of the plurality of sink devices can be determined. An initial value of a maximum bandwidth usage parameter related to the point-to-multipoint Bluetooth network can be determined. A new set of values of the configuration parameters different from the initial set of values can be determined. The new set of values may be determined to allocate bandwidth usage values between the plurality of multimedia communication links without exceeding the value of the maximum bandwidth usage parameter.

20 Claims, 5 Drawing Sheets

(51) Int. Cl.
*G10L 19/22* (2013.01)
*H04W 72/30* (2023.01)
*H04W 76/40* (2018.01)
*H04W 84/18* (2009.01)

(52) U.S. Cl.
CPC ......... *H04W 76/40* (2018.02); *H04R 2420/07* (2013.01); *H04W 84/18* (2013.01)

(56) References Cited

U.S. PATENT DOCUMENTS

| | | | |
|---|---|---|---|
| 7,970,350 B2 * | 6/2011 | Sheynman | H04W 12/50 455/414.1 |
| 8,401,523 B2 * | 3/2013 | Kim | H04W 28/24 455/343.1 |
| 10,158,985 B2 * | 12/2018 | Girardier | H04S 7/308 |
| 10,728,866 B2 * | 7/2020 | Koffman | H04W 48/18 |
| 2011/0129048 A1 * | 6/2011 | Barbe | H04W 56/0015 375/371 |
| 2016/0065646 A1 | 3/2016 | Tonshal et al. | |
| 2016/0286341 A1 | 9/2016 | Lee et al. | |

\* cited by examiner

METHOD FOR MANAGING A PLURALITY OF MULTIMEDIA COMMUNICATION LINKS IN A POINT-TO-MULTIPOINT BLUETOOTH NETWORK

CROSS-REFERENCES TO RELATED APPLICATIONS

This application is a continuation of U.S. patent application Ser. No. 17/607,304, filed Oct. 28, 2021, which is a national stage phase entry under 35 U.S.C. § 371 of International Application No. PCT/EP2020/070870, filed Jul. 23, 2020, which claims priority to European Patent Application No. 19315077.8, filed Jul. 26, 2019, all of which are hereby incorporated herein by reference.

BACKGROUND OF THE INVENTION

The present invention relates to wireless communication, and more specifically to a method for dynamically modifying configurations of a plurality of multimedia communication links in a point-to-multipoint Bluetooth network established between a source device and a plurality of sink devices.

By "configuration of a multimedia communication link", it is meant a set of parameters that determines how data are transmitted between the source device and the respective sink device. These parameters are referred to as "configuration parameters". By "modifying configuration of a multimedia communication link", it is meant modifying one or several configuration parameters among the set of configuration parameters for said multimedia communication link.

In one or several embodiments, the sink devices may be Bluetooth loudspeakers. By "loudspeaker", it is meant any electroacoustic transducer, which converts an electrical audio signal into a corresponding sound. The term "loudspeaker" includes for instance audio speakers of a stereo system, headphones, earbuds, hearing aids, etc. The audio source device (or simply "source device", or "source") may be, for instance, a mobile phone, a portable game player, a portable media player, a computer, a tablet, a television, a control device of a stereo system, etc. In the following, the source device may also be referred to as "master device".

Bluetooth is a communication standard that is well-known to the person skilled in the art, managed by a group of organizations (Bluetooth SIG) that has issued successive versions. Bluetooth enables a short-distance bidirectional exchange of data between a master device and one or more sink devices, said master device and said sink devices belonging to a piconet network, which designates a network covering a personal zone. Therefore, the range of Bluetooth equipment is limited to a few tens of meters. Bluetooth uses radio waves that are situated in the UHF band (between 300 MHz and 3 GHz). Bluetooth aims to simplify connections between electronic devices by removing cable connections. Thus Bluetooth enables cables between a source multimedia device (hi-fi system, car radio, computer, tablet, mobile telephone, etc.) to be replaced by wireless communications and multimedia sink devices such as speakers arranged to play a received multimedia stream. Bluetooth speakers have met with a certain success due to their high portability.

There are solutions of the prior art for controlling a plurality of Bluetooth sink devices from a source device by creating a point-to-multipoint link between the source device and the plurality of sink devices, even though this is not initially provided by the Bluetooth standard. A point-to-multipoint link may be seen as a plurality of point-to-point links, each of them linking the Bluetooth device and a given sink device among the plurality of sink devices, this plurality of point-to-point links being established "permanently" during the connection time (as opposed to the standard Bluetooth communication, in which quick switches to new connections are typically performed by terminating a previous connection while keeping the previous connected sink device in memory).

In the Bluetooth standard, audio transmission is defined by the Advanced Audio Distribution Profile (A2DP). The A2DP profile is based on the AudioNideo Distribution Transport Protocol (AVDTP) building block which defines the procedures between Bluetooth devices for establishing the audio stream, negotiating the audio stream parameters and transmitting the audio stream data. According to the AVDTP, an audio stream must be established between two Stream End Points (SEPs).

A SEP represents the resources and capacities of a device. For example, a device such as a portable telephone may have three SEPs, one representing its video receiver capacities, another representing its audio receiver capacities with an SBC codec and a last representing its audio receiver capacities with an aptX codec. Each codec must be associated with a SEP that is different from that or those to which one or more codec(s) is or are associated, but a same codec can be associated with several SEPs.

A limitation imposed by the AVDTP according to the Bluetooth standard is that when a stream has been negotiated between two SEPs, these two SEPs must be locked to each other to deliver it. A used SEP cannot be part io of another stream. Switching to a new stream is typically done by terminating the previous one (such as current social modes).

A solution for controlling a plurality of Bluetooth sink devices from a source device is to create several SEPs in the source device controlling chip. A distinct Source SEP may be generated for each Sink SEP to establish one audio stream between the source device and each sink device.

For example, and for this implementation, it is referred to application EP17182123.4, which proposes a Bluetooth chip configured to implement a modified A2DP profile so as to create such point-to-multipoint link. According to this solution, a single Bluetooth chip can be used to control several Bluetooth multimedia devices. The A2DP profile is modified without violating the Bluetooth standard, so that interoperability is preserved and the Bluetooth functions are normally supported.

According to such solution, it is possible to transmit respective audio packets from the master device to each of the sink devices, the master device and the sink devices therefore belonging to a same piconet.

In general, the configuration of a Bluetooth link between a source device and a sink device is determined when the connection is established, and is not modified after. For instance, the master device may send a request to obtain the audio capabilities of the sink device and, based on the response, select the suitable audio parameters of the link.

Some methods have been proposed in the prior art to adapt dynamically the audio bitrate based on the available Bluetooth bandwidth. For instance, U.S. Pat. No. 8,031,658 proposes to dynamically change the bitrate used in the Codec based on conditions of the Bluetooth connection. US 2013/0304458 relates to a source device wherein the controller is adapted for changing audio parameters based on the bandwidth between the communicating Bluetooth devices.

However, these methods involve modifying the configuration of a single link, in the context of a master device connected to a single sink device via a traditional point-to-point link.

In the context of a master device connected to a plurality of devices via a point-to-multipoint link, such methods are not satisfactory, because they do not take into account the other sink devices of the piconet when the configuration of a link (between the master device and one sink device) is modified.

Indeed, having multiple audio devices connected to a master device via a point-to-multipoint link introduces new issues and new limitations. For instance, because the Bluetooth bandwidth is limited, audio configurations with high bandwidth usage may not be suitable when there are multiple sink devices. In practice, the Bluetooth audio bandwidth is about 1.1 Megabit per second (Mbit/s) for a single chipset. If a smartphone is connected to a first Bluetooth speaker using an LDAC codec 990 kbit/s configuration, there is not enough bandwidth for a second speaker.

The Bluetooth standard does not include protocols for managing multiple concurrent connections in the particular context of audio/video streaming. If a plurality of sink devices stream audio/visual content from a source, multiple factors could deteriorate the connection for all the sink devices, such as an over-utilization of the bandwidth, unstable connections or heterogeneous connection qualities between sink devices. The playback quality of multimedia content may be therefore greatly reduced, and the user's comfort is seriously degraded.

An object of the present disclosure is therefore directed to a method for dynamically changing configuration of a plurality of multimedia communication links in a point-to-multipoint Bluetooth network established between a source device and a plurality of sink devices.

SUMMARY OF THE INVENTION

The invention relates to a method for managing a plurality of multimedia communication links in a point-to-multipoint Bluetooth network established between a source device and a plurality of sink devices. The method may be performed by the source device.

The method may comprise:
/a/ determining:
  an initial set of values of configuration parameters respectively related to each sink device of the plurality of sink devices, and
  an initial value of a maximum bandwidth usage parameter related to the point-to-multipoint Bluetooth network;
/b/ determining a new set of values of the configuration parameters different from the initial set of values upon:
  receiving a request for adding a new sink device to the plurality of sink devices of the point-to-multipoint Bluetooth network, or
  receiving a request for changing a value of a configuration parameter related to a sink device of the plurality of sink devices, or
  determining an updated value of the maximum bandwidth usage parameter,
  wherein the new set of values is determined to allocate bandwidth usage values between the plurality of multimedia communication links without exceeding the value of the maximum bandwidth usage parameter.

By "multimedia communication link", it is meant a communication link established according any Bluetooth protocol (as described for instance in the Bluetooth Core Specification version 5.1 or in earlier versions of the Bluetooth Core Specification—of course, the Bluetooth protocol may also be any future version of the current protocol), including Bluetooth BR/EDR (Bluetooth Basic Rate/Enhanced Data Rate), but also Bluetooth low energy (LE).

By "maximum bandwidth usage parameter", it is meant a parameter corresponding to an effective bandwidth that can be used for transmitting multimedia data over the Bluetooth network. The value of the maximum bandwidth usage parameter may be different (lower) from the theoretical value of the system bandwidth (i.e. the bandwidth theoretically provided by a given Bluetooth protocol), for instance because of noise and/or interferences that may occur on one or several links of the point-to-multipoint network.

By "bandwidth usage value" it is meant a bandwidth allocated to a respective sink device for transmitting data from the source device to said sink device. The bandwidth usage value may be a data rate, or a number of available Bluetooth slots, or any other parameter measuring a bandwidth allocated to a link in the Bluetooth network.

The above method allows dynamically reconfiguring one or more Bluetooth links in case of a change of the network, so as not to exceed the value of the bandwidth which is actually allowed by the network. Thus, the audio system is more stable, and the auditory comfort of the user is improved.

In one or several embodiments, the method may further comprise: transmitting audio information to the sink devices of the plurality of sinkdevices over the respective multimedia communication links of the point-to-multipoint Bluetooth network based on the initial set of values of configuration parameters.

The method may further comprise:
/c/ transmitting audio information to the sink devices of the plurality of sink devices over the respective multimedia communication links of the point-to-multipoint Bluetooth network based on the new set of values.

In one or several embodiments the configuration parameters comprise a 10 multimedia configuration parameter, and/or a Bluetooth connection parameter.

For instance, the configuration parameters may comprise a multimedia configuration parameter among:
  a type of codec,
  a parameter relative to a codec,
  a type of data,
  an audio channel selection parameter, and
  a sampling rate parameter.

Alternatively the configuration parameters comprise a Bluetooth connection parameter among:
  a Flush Timeout parameter,
  a channel type parameter,
  a quality of service parameter,
  a number of retransmission parameter,
  a MTU parameter,
  a packet type parameter; and
  a Bluetooth Low Energy, BLE, link parameter.

In one or several embodiments, the bandwidth usage values may be data rates and the configuration parameters may comprise, for each sink device of the plurality of sink devices, a respective set of types of codec supported by said slave device. Each type of codec among the respective set of types of codec may be associated to a respective list of possible bitrates. Step /b/ may further comprise:

for each sink device among the plurality of sink devices:
  determining a type of codec among the set of types of codec supported by said sink device and a bitrate among a list of possible bitrates respectively associated to the determined type of codec;
  determining a packet type parameter among the respective set of packet type parameters;
  determining a number of Bluetooth slots based on the determined packet type parameter and the determined bitrate;
  wherein the sum of the numbers of Bluetooth slots determined for the plurality of sink devices is below the value of the maximum bandwidth usage parameter.

By "packet type parameter" it is meant the type of frame (e.g. DM or DH) associated to a number of occupied slots (e.g. DM1, DM3, DM5, DH1, DH3, DH5, . . . ). In EDR (Enhanced Data Rate), the data rate may be doubled or tripled in DH frames, with packet type parameters indicated as "2-DH1" or "3-DH5".

Defining the value of the bandwidth usage parameter as a number of available Bluetooth slots is advantageous since a Bluetooth packet may not be completely filled with data.

Alternatively, the configuration parameters may comprise, for each sink device of the plurality of sink devices:
  a respective type of codec used for processing audio data to be transmitted to said sink device;
  a respective bitrate associated to said type of codec; and
  a respective audio channel parameter for playing an audio content corresponding to said audio data;

The method may further comprise:
  receiving, for each sink device of the plurality of sink devices, a respective spatial position information for said sink device relative to other sink devices of the plurality of sink devices; receiving, for each sink device of the plurality of sink devices, a respective set of numbers of channels supported by said device;

and /b/ may further comprise:
  for each sink device among the plurality of sink devices, determining, based on the spatial position information received for each sink device of the plurality of sink devices:
    a type of codec among the set of types of codec supported by said sink device;
    a respective audio channel parameter, wherein said respective audio channel parameter is further determined based on the set of numbers of channels supported by said sink device; and
    a bitrate among a list of possible bitrates respectively associated to the determined type of codec;
  for each sink device among the plurality of sink devices, determining a respective bandwidth usage value, based on the determined type of codec, the determined audio channel parameter and the determined bitrate;
  wherein a sum of the determined bandwidth usage values for all the sink devices of the plurality of sink devices is below the value of the maximum bandwidth usage parameter.

In one or several embodiments, the configuration parameters may comprise, for at least one sink device of the plurality of sink devices, a parameter for stopping a transmission of data or payload to said sink device.

Another aspect of the invention relates to a Bluetooth device. The Bluetooth device may comprise a Bluetooth chip, a processor and a memory, said Bluetooth device being configured for establishing a plurality of multimedia communication links with a plurality of sink devices in a point-to-multipoint Bluetooth network. The Bluetooth device may be configured for:
  /a/ determining:
    an initial set of values of configuration parameters respectively related to each sink device of the plurality of sink devices, and
    an initial value of a maximum bandwidth usage parameter related to the point-to-multipoint Bluetooth network;
  /b/ determining a new set of values of the configuration parameters different from the initial set of values upon:
    receiving a request for adding a new sink device to the plurality of sink devices of the point-to-multipoint Bluetooth network,
    receiving a request for changing a value of a configuration parameter related to a sink device of the plurality of sink devices, or
    determining an updated value of the maximum bandwidth usage parameter,
  wherein the new set of values is determined to allocate bandwidth usage values between the plurality of multimedia communication links without exceeding the value of the maximum bandwidth usage parameter Yet another aspect of the invention relates to a non-transitory computer readable storage medium, having stored there on a computer program comprising program instructions, the computer program being loadable into a data-processing unit and adapted to cause the data-processing unit to carry out the steps of the above method when the computer program is run by the data-processing device.

BRIEF DESCRIPTION OF THE DRAWINGS

The present invention is illustrated by way of example, and not by way of limitation, in the figures of the accompanying drawings, in which like reference numerals refer to similar elements and in which.

DESCRIPTION OF PREFERRED EMBODIMENTS

Figure 1:
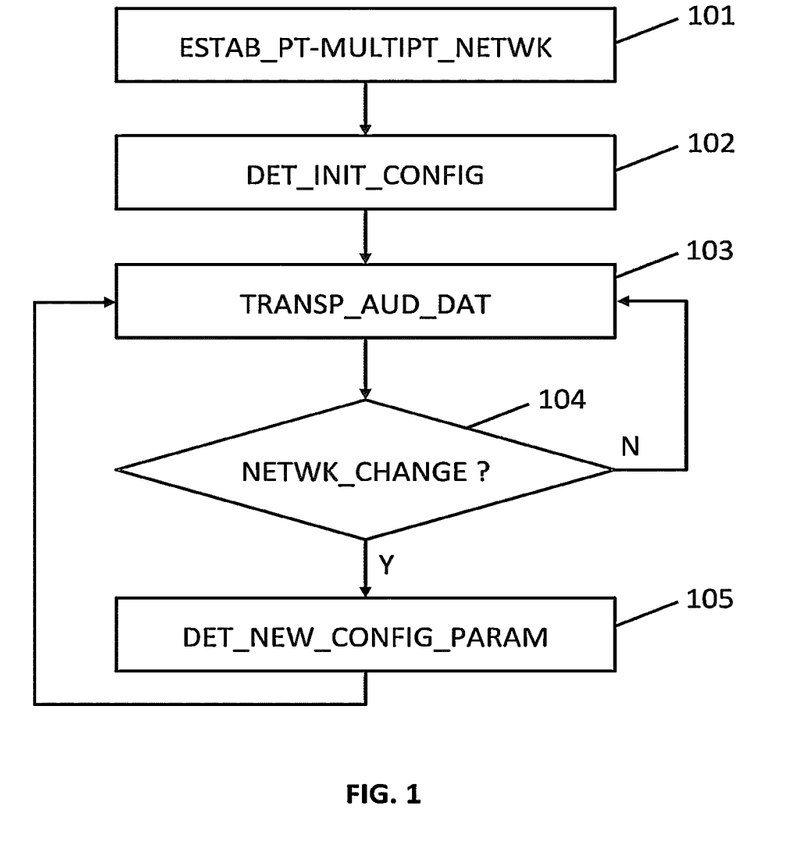
FIG. 1 is a flow chart describing a possible embodiment of the present invention.

FIG. 1 is a flow chart describing a possible embodiment of the present invention.

The steps of the flow chart of FIG. 1 may be performed by the source device, i.e. the device which configured for transmitting multimedia data to the respective sink device(s) of the piconet based on the set of configuration parameters of the Bluetooth network.

In a first step 101, a point-to-multipoint Bluetooth network is established between the source device and the plurality of sink devices. A plurality of communication links is therefore created, each communication link connecting the source device and a respective sink device among the plurality of sink devices. The point-to-multipoint network may be established, for instance, according to the implementation provided in application EP17182123.4, but other implementations may be used. For instance, the point-to-multipoint network may be a BLE network established based on LE isochronous channels.

At step 102, an initial configuration is determined for the established point-to-multipoint Bluetooth network. More specifically, step 102 comprises the steps of:
- determining an initial value of a maximum Bandwidth usage parameter for the point-to-multipoint Bluetooth network; and
- determining an initial set of values of configuration parameters, wherein one or more values among the initial set of values are related to a respective sink device among the plurality of sink devices.

Audio information may be transported 103 between the source device and the sink devices over the plurality of established communication links. For instance, the audio information may be an audio or a stereo stream including packets incorporating audio data.

The source device may further be configured to detect 104 a change in the network that affects the allocation of bandwidth to the different sink devices of the network, and that requires changing the configuration of the network links. This change may be:
- a new sink device that is added to the plurality of sink devices of the network;
- a change of the value of a configuration parameter related to a sink device of the plurality of sink devices; or
- a change of the value of the maximum bandwidth usage parameter.

As long as no change in the network is detected (step 104, "N"), the configurations of the wireless communication links of the network are not modified and audio data continues to be transported 103 on these communication links, according to the initial configuration.

When a change of in the network is detected (step 104, "Y"), a new set of values of the configuration parameters is determined (step 105) so as to allocate data rates between the plurality of communication links without exceeding the value (initial value or, if a new value has been determined at step 104, said new value) of the maximum bandwidth usage parameter.

The configurations of one or more communication links are then modified and the audio data may be transported 103 on the reconfigured link(s).

By "maximum Bandwidth usage parameter", it is meant the maximum effective bandwidth available for transmitting data over the Bluetooth network. For a Bluetooth piconet, there is a theoretical maximal bandwidth that can be used for transporting data between the source device and the sink devices. This theoretical maximum bandwidth may range from a few hundreds of bits per second (for BLE) to a few tens of Mbit/s (for Bluetooth 3.0). In practice, the theoretical maximum bandwidth may not be fully available, because of the connection conditions (e.g., interferences, lack of stability, etc.). Therefore, the "maximum Bandwidth usage parameter" may actually have a value that is much lower than the theoretical maximum bandwidth, when the connection conditions are bad.

The determination 102 of the value of the maximum Bandwidth usage parameter may be performed by the source device by any Bandwidth management technique. For instance, an initial value of the maximum Bandwidth usage parameter may be fixed, and the value may be updated based on the size of the transmission queue (if the size of the transmission queue increases, it means that the bandwidth is already completely used—therefore the value of the maximum Bandwidth usage parameter have to be decreased; on the contrary when the transmission queue is empty, it means that there is still available bandwidth).

The "configuration" of a communication link between the source device and a sink device corresponds to a respective set of configuration parameters that determines how data are transmitted between the source device and the sink device. These configuration parameters may comprise Bluetooth connection parameters associated with the wireless communication link, and multimedia configuration parameters.

By Bluetooth connection parameters, it is meant parameters related to low-level building blocks defined by the Bluetooth standard, such as the "Baseband" building block, the "LMP" ("Link Manager Protocol") building block, the "L2CAP" ("Logical Link Control and Adaptation Protocol") building block, or the "SDP" ("Service Discovery Protocol"). For instance, the Bluetooth parameters may include the number of retransmissions, the packet type, the MTU, the FTO (or "Flush Timeout") value, which defines the expiration period for a data packet in a buffer memory of a source device, a QoS ("Quality of service") parameter, which defines the maximum latency between the inclusion of a packet to be transmitted in a L2CAP channel and its effective transmission, etc. When the point-to-multipoint network involves BLE links, the Bluetooth parameters may include a connection interval, a MTU or isochronous channel parameters.

By multimedia configuration parameters it is meant parameters related to a configuration of a link for transmitting multimedia data, e.g. audio data. In the Bluetooth standard, audio transmission may be performed, for instance, by using the Advanced Audio Distribution Profile (A2DP). The A2DP profile is based on the Audio/Video Distribution Transport Protocol (AVDTP) building block which defines the procedures between Bluetooth devices for establishing the audio stream, negotiating the audio stream parameters and transmitting the audio stream data.

In case of audio transmission, the multimedia configuration parameters may comprise:
- the type of coder/decoder (Codec) to be used for encoding audio data to be sent or for decoding received audio data: according to the Bluetooth protocol, SBC (for "Low Complexity Subband Codec") is the only codec that currently has to be supported by any Bluetooth device, but other Codecs may be used, such as AAC (for "Advanced Audio Coding"), LDAC, Apt-X or LC3. The choice of the type of codec may improve or decrease the audio content quality;
- parameters relative to the Codec: for example, the bitrate, the channel configuration (mono, stereo or joint-stereo), etc.;
- the type of audio data to transmit for each audio channel: for instance, "Left", "Right", or a combination of both (for instance (Left+Right)/2);
- the sampling rate;
- etc.

It is noted that the determination 104 of a change in the network may be triggered automatically (e.g. if a new device is connected, or if a new value of the maximum bandwidth usage parameter is determined because interferences occur on a link); or manually, by a user action (e.g. is the user chooses the position of a speaker, which requires to change values of configuration parameters of one or more sink devices).

The modification of configuration of the communication link based on the determined operating mode may be done in several ways. In one or several embodiments, the "reconfigure command" of AVDTP (defined in the AVDTP specification) may be used for reconfiguring multimedia parameters of each communication link connecting the source device to a respective sink device. This command allows devices participating within a stream to change Application Service Capabilities.

For instance, the following procedure may be used. First, a "Suspend Streaming Procedure" may be performed for suspending the stream. Then, a Reconfigure Command may be used for changing current capability settings. After the reconfiguration, the streaming may be restarted by using the "Start Streaming Procedure".

Other techniques may be used for reconfiguring the communication links, which do not require suspending the streaming procedure (for instance by changing the bitpool of the SBC codec to reduce the bitrate). Thus, the communication links are dynamically reconfigured without interrupting the streaming.

Figure 2:
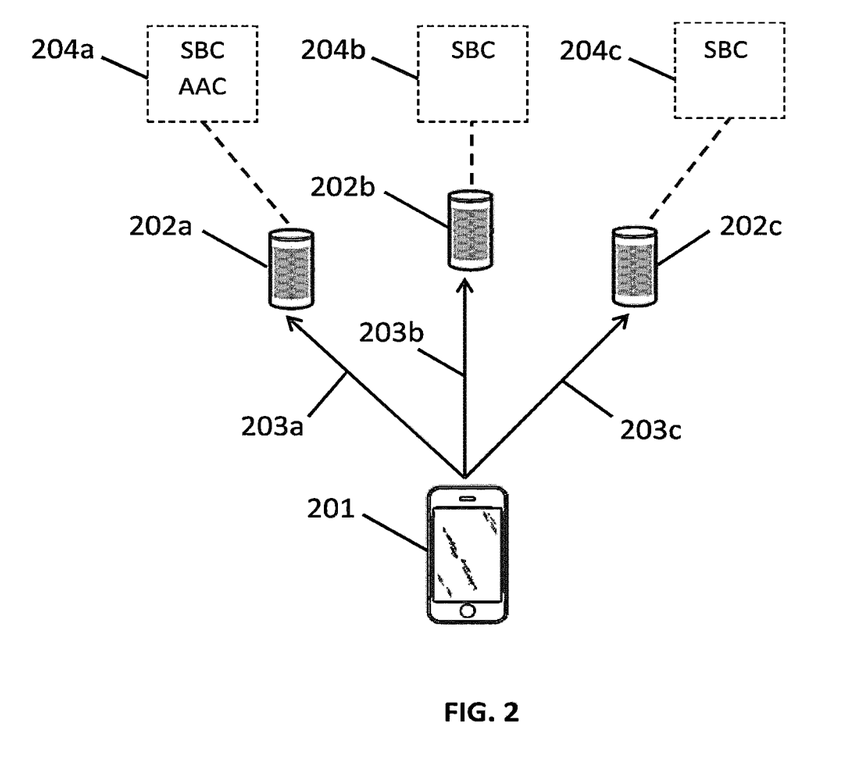
FIG. 2 represents a determination of a set of values of configuration parameters in a possible embodiment of the invention.

FIG. 2 represents a determination of a set of values of configuration parameters in a possible embodiment of the invention.

In this embodiment, the configuration parameters comprise, for each sink device among the plurality of sink devices, a respective codec type and a bitrate associated to the respective codec type.

The source device 201 is connected to a plurality of sink devices 202a, 202b, 202c via a point-to-multipoint Bluetooth network. Therefore, a plurality of Bluetooth links 203a, 203b, 203c are established between the source device 201 and respective sink devices 202a, 202b, 202c.

Each sink device 202a, 202b, 202c may support a respective list of types of codec 204a, 204b, 204c. In the illustrative example of FIG. 2, the sink devices 202b and 202c only support the Bluetooth mandatory codec SBC, while the sink device 202a supports both the SBC codec and the AAC codec.

A type of codec may be determined for each sink device 202a, 202b, 202c, together with a value of bitrate used for coding/decoding the data. This determination may be performed such that the sum of the bitrates for all the sink devices 202a, 202b, 202c is below the value of the maximum bandwidth usage parameter, as exemplified below.

By default, the parameters used for the SBC codec are High-Quality settings (as defined by the A2DP specification), with joint stereo channels, and a bitrate of 328 kbps for each of the sink devices 202b and 202c.

Since the AAC codec provides a better audio quality with a lower bitrate (128 kbps is considered equivalent in term of quality) than the SBC codec, the AAC codec is automatically selected with respect to the SBC codec for the sink device 202a. Therefore, the overall sound quality is improved while saving bandwidth, to distribute it among the different sink devices.

Assuming that the value of the maximum bandwidth usage parameter is equal to 1.1 Mbps, it is possible to use SBC at a bitrate of 328 kbps for each of the sink devices 202b and 202c, and AAC at a bitrate of 128 kbps for the sink device 202a. Indeed, the resulting system needs to use 328×2+128=784 kpbs, which is lower than 1.1 Mbps.

If, because of noise or interferences on one or more links of the network, the maximum bandwidth usage parameter is actually equal to 0.7 Mbps, the bandwidth usage of the system exceeds this value, making the sound system unstable. The source device may therefore decrease the bitrate for one or several links, in order to reduce the bandwidth usage of the system. For instance, a bitrate of 229 kbps (Mid-quality settings as defined by the A2DP specification) may be selected for the link 203b, so that the bandwidth usage of the system is equal to 328+229+128=685 kpbs.

To anticipate a change of value of the maximum bandwidth usage parameter (e.g. due to interferences or instabilities of the network), it is possible to set a threshold value (e.g. 70% of the theoretical maximum bandwidth usage), and to determine the bitrates such that their sum for all the sink devices 202a, 202b, 202c is below the value of this threshold.

It is noted that the maximum bandwidth usage parameter may be defined otherwise than by a number of bits per second. For instance, the maximum bandwidth usage parameter may be a number of available Bluetooth time slots. Bluetooth packets are transmitted over one or several time slots, each time slot being equal to 625 µs. Depending on the configuration, a Bluetooth packet may not be necessarily filled entirely with audio data. For instance, if the codec is SBC with joint-stereo channels and a bitpool of 53 (resulting in a bitrate of 328 kpbs), the length of an audio frame is 119 bytes. If the Bluetooth packet type is 2-DH5, the available payload size is 679 bytes and only 5 audio frames can be put into the packet while there are 67 remaining empty bytes (headers count for 17 bytes). Thus, when packets are not entirely filled, it may make more sense to define the bandwidth usage as a number of Bluetooth slots to take into account the empty bytes in packets. For the sake of clarity and simplicity, the description below will keep the bandwidth usage parameter as a bitrate value, but similar reasoning can be applied using time slots or any other Bluetooth bandwidth usage measurement index.

The determination described above with reference to FIG. 2 may be used for determining the initial set of values of configuration parameters (step 102 of FIG. 1).

It also may be used for determining a new set of values of the configuration parameters (step 105 of FIG. 1) upon detection of a change in the network (step 104 of FIG. 1), for instance in case of a change of the value of the maximum bandwidth usage parameter (as exemplified above), or when a new sink device is added to the plurality of sink devices of the network.

Upon receiving a request for adding a new sink device to the plurality of sink devices of the point-to-multipoint Bluetooth network, the source device 201 may establish a new link with said new sink device. The source device 201 may further receive the types of codec that are supported by this new sink device.

For example, considering the illustrative network of FIG. 2 with a maximum bandwidth usage parameter equal to 1.1 Mbps, assume that the new sink device supports only SBC. If the bitrate is chosen by default at 328 kbps for the new sink device and for the sink devices 202b and 202c, and if AAC codec at 128 kbps is used for the sink device 202a, the bandwidth usage of the system is equal to 328×3+128=1112 kpbs, which exceeds 1.1 Mbps, making the sound system unstable.

To avoid this instability, the source device may decrease the bitrate for one or several links, in order to reduce the bandwidth usage of the system. For instance, a bitrate of 229 kbps may be selected for the new link, so that the bandwidth usage of the system is equal to 328×2+229−F128=1013 kpbs, which is below the maximum bandwidth usage parameter.

In one or several embodiments, each sink device 202a, 202b, 202c may support one or several type of audio data among: "mono" and "joint stereo". The configuration parameters may also comprise, for each sink device among the plurality of sink devices, a respective audio channel parameter for playing the audio content corresponding to the received audio data. The audio channel parameter may correspond to a type of data and a type of channel (e.g. "mono, right"). For mono data, the type of channel may be for instance "left" (L), "right" (R), or a downmixed channel (D) of a left channel and a corresponding right channel. For stereo data, the type of channel may be for instance "L/L", "R/R", "D/D", "L/R" or any other combination.

Indeed, sending mono data requires less bandwidth than sending stereo data (bitrates of mono codecs are lower than those of stereo codecs). When there are only two loudspeakers, it is usually possible to send stereo data on each link (e.g., with a maximum bandwidth usage parameter of 1.1 Mbps 30 and for SBC codec at 328 kbps, only 656 kbps are used). However, when there are more than two loudspeakers, sending stereo data may become too greedy in bandwidth (e.g., for four loudspeakers, with a maximum bandwidth usage parameter of 1.1 Mbps and for SBC codec at 328 kbps, 1312 kbps are used, which is too important). In this case, for one or several links, it is possible to send mono data rather than stereo data, to reduce the bitrate and keeps the overall bandwidth usage lower than the practical maximum bandwidth usage parameter.

Figure 3:
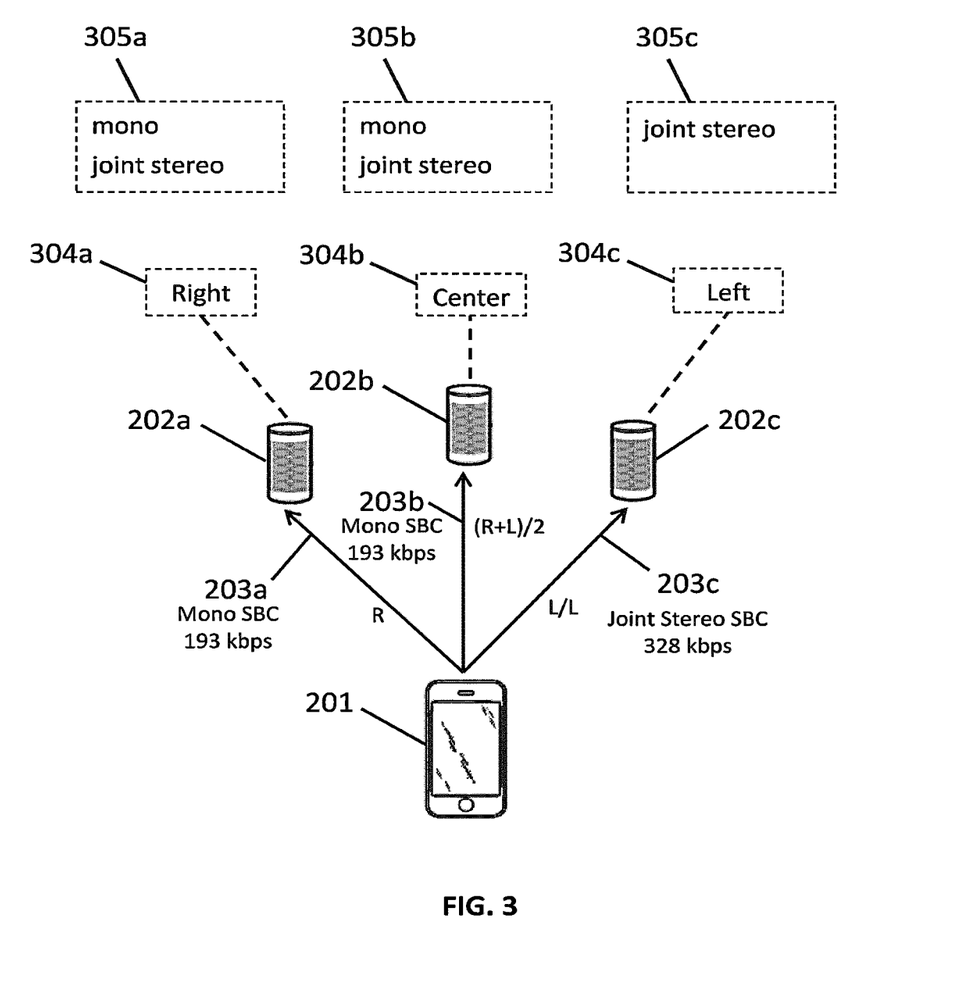
FIG. 3 represents a determination of a set of values of configuration parameters in another possible embodiment of the invention.

FIG. 3 represents a determination of a set of values of configuration parameters in another possible embodiment of the invention.

In this embodiment, the configuration parameters comprise, for each sink device among the plurality of sink devices, a respective codec type and a bitrate associated to the respective codec type, a respective type of audio data (mono/stereo) that can be supported by the sink device and a respective audio channel parameter for playing the audio content corresponding to the received audio data.

The source device 201 is connected to a plurality of sink devices 202a, 202b, 202c via a point-to-multipoint Bluetooth network. Therefore, a plurality of Bluetooth links 203a, 203b, 203c are established between the source device 201 and respective sink devices 202a, 202b, 202c.

Each sink device 202a, 202b, 202c may support a respective list of types of codec. In the illustrative example of FIG. 2, for the sake of simplification, it is assumed that all the sink devices 202a, 202b and 202c only support the Bluetooth mandatory codec SBC. Each sink device 202a, 202b, 202c may support a respective list 305a, 305b, 305c of types of audio data among: "mono" and "joint stereo". In the example represented in FIG. 3, the sink devices 202a and 202b supports both mono and joint stereo configuration, while the sink device 202c supports only joint stereo configuration.

In this embodiment, the source may receive information 304a, 304b, 304c relative to spatial positions of at least one of the sink devices 202a, 202b, 202c. This information 304a, 304b, 304c may come from an action of the user who assigns a respective position to the different speakers connected to the Bluetooth network (manual trigger).

A type of codec may therefore be determined for each sink device 202a, 202b, 202c, together with a value of bitrate used for coding/decoding the data, a type of data and a respective audio channel parameter. This determination may be performed such that the sum of the bitrates for all the sink devices 202a, 202b, 202c is below the value of the maximum bandwidth usage parameter, based on the information 304a, 304b, 304c relative to the spatial positions of the sink devices 202a, 202b, 202c.

For instance, if the user selects the position "right" for the device 202a, there is no need to send both Left (L) and Right (R) channels to this sink device 202a. Assuming that sink device 202a supports both mono and stereo configuration, the source device 201 may configure the corresponding link 203a to a mono link with only "Right" data, with mono SBC codec at a bitrate of 193 kbps (which is lower than the bitrate of 328 kbps associated to a stereo configuration for similar audio quality). By choosing a mono configuration rather than a stereo configuration, the bandwidth usage of the audio system is therefore reduced.

Similarly, assume that the user selects the position "center" for the device 202b and the position "left" for the device 202c. Assume also that the sink device 202b supports both mono and stereo configuration, but that the sink device 202c only supports stereo configuration. The source device 201 may configure the link 203b to a mono link with only downmixed data (e.g. an average between right audio data and corresponding left audio data), with mono SBC codec at a bitrate of 193 kbps. Since the sink device 202c does not support mono configuration, the source device 201 may configure the link 203c to a stereo link with "Left" data on both channels, with stereo SBC codec at a bitrate of 328 kbps.

This network configuration is compatible with a maximum bandwidth usage parameter is equal to 1.1 Mbps, since the bandwidth usage of the system is equal to 193+193+328=714 kpbs<1.1 Mbps.

If the maximum bandwidth usage parameter falls at 0.7 Mbps for instance, the bitrates used for one or several links 203a, 203b, 203c may be reduced and/or the types of codec for one or several sink devices 202a, 202b, 202c may be changed to select types of codec that enable lower bitrates (if the sink device 202a, 202b, 202c supports several types of codec).

The determination described above with reference to FIG. 3 may be used for determining the initial set of values of configuration parameters (step 102 of FIG. 1), or for determining a new set of values of the configuration parameters (step 105 of FIG. 1) upon detection of a change in the network (step 104 of FIG. 1), when the source device receives spatial position information respectively associated to one or more sink devices among the plurality of sink devices 202a, 202b, 202c.

Figure 4:
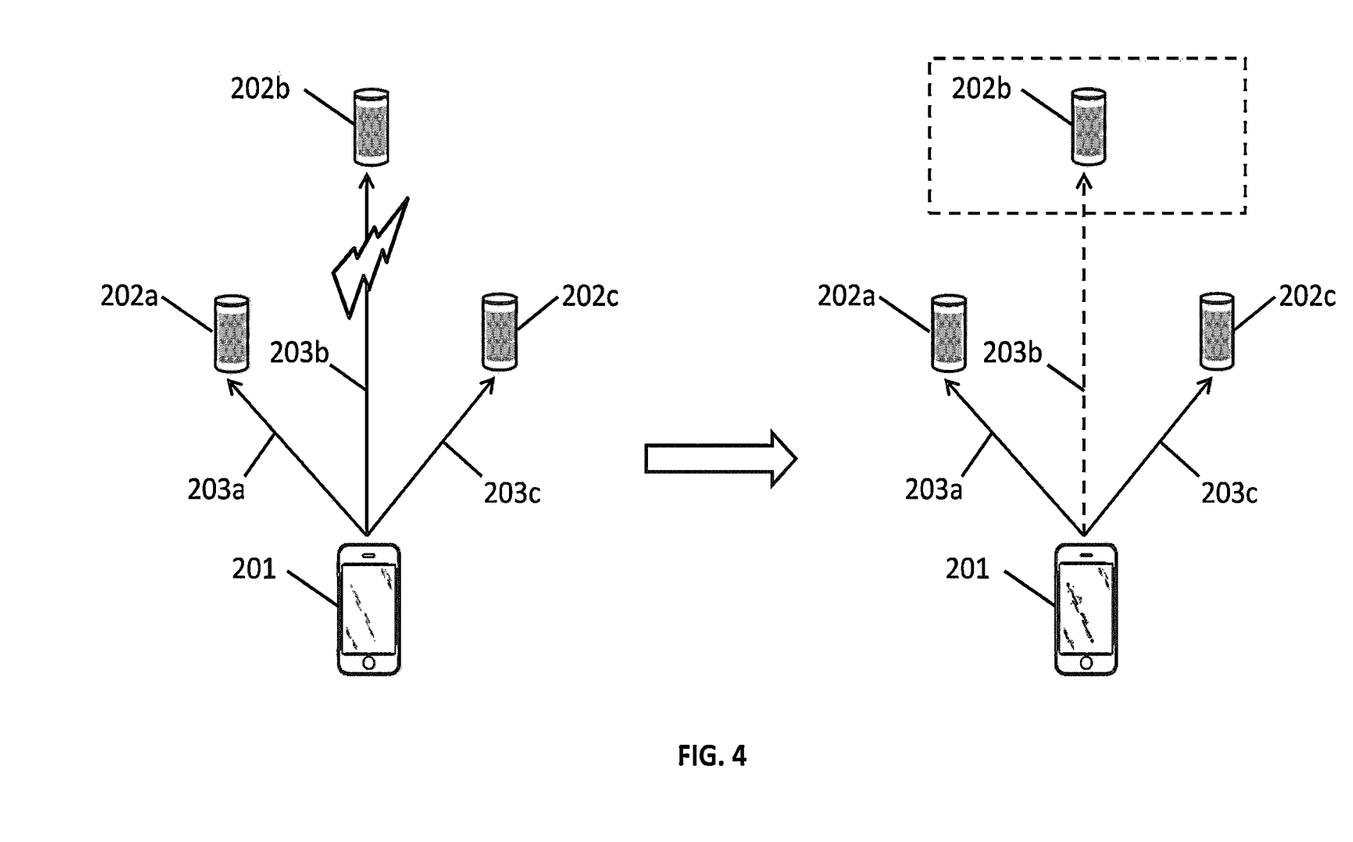
FIG. 4 represents a determination of a set of values of configuration parameters in yet another possible embodiment of the invention.

FIG. 4 represents a determination of a set of values of configuration parameters in another possible embodiment of the invention.

In this embodiment, the configuration parameters may comprise, for each sink device among the plurality of sink devices, a respective codec type and a bitrate associated to the respective codec type.

The source device 201 is connected to a plurality of sink devices 202a, 202b, 202c via a point-to-multipoint Bluetooth network. Therefore, a plurality 25 of Bluetooth links 203a, 203b, 203c are established between the source device 201 and respective sink devices 202a, 202b, 202c.

Each sink device 202a, 202b, 202c may support a respective list of types of codec. In the illustrative example of FIG. 2, for the sake of simplification, it is assumed that all the sink devices 202a, 202b and 202c only support the Bluetooth mandatory codec SBC.

It is assumed that each sink device 202a, 202b, 202c is associated to a respective type of codec and a respective value of bitrate used for coding/decoding the data, and that the sum of the bitrates for all the sink devices 202a, 202b, 202c is below the value of the maximum bandwidth usage parameter.

Now assume that the value of the maximum bandwidth usage parameter is reduced because of one Bluetooth link 203b among the plurality of Bluetooth links 203a, 203b, 203c. Such situation may occur for instance when said link 203b is impacted by noise and/or interferences (e.g. because the corresponding sink device 202b is moved to the limit of the Bluetooth range). Consequently, a lot of Bluetooth packets needs to be retransmitted for this device 202b, and the effective maximum bandwidth usage parameter is reduced, which can make the sound system unstable (and introduce audio drops.

To avoid this issue, the source device 201 may detect that the link 203b is unstable and choose Medium-Quality settings for the codec used for this link 203b, to reduces the bitrate and keep the overall bandwidth usage lower than the value of the effective maximum bandwidth usage parameter.

However, if such diminution is not possible or if the link 203b still remains unstable, the source device 201 may choose to interrupt the transmission of audio data to the sink device 202b. In this case, the configuration of the Bluetooth network is modified, the configuration parameters comprising a parameter for stopping the transmission of audio data or payload to the sink device 202b.

Figure 5:
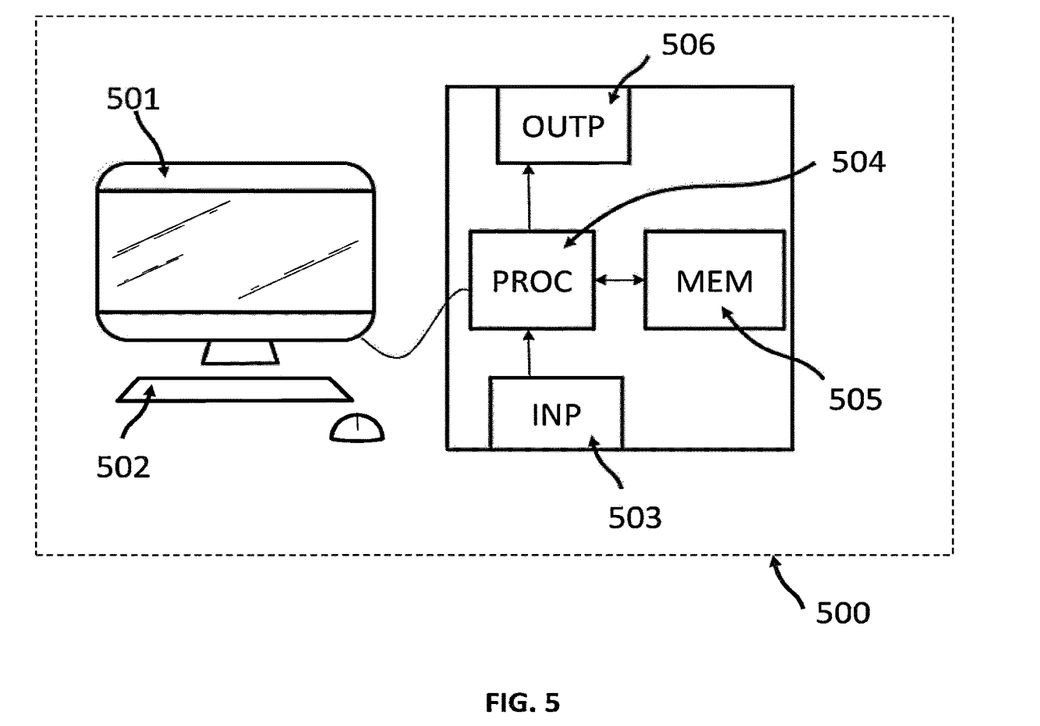
FIG. 5 represents a possible embodiment for a device that enables the present invention.

FIG. 5 is a possible embodiment for a device that enables the present invention. Such device may be incorporated into the master device or into the slave device.

In this embodiment, the device 500 comprises a computer, this computer comprising a memory 505 to store program instructions loadable into a circuit and adapted to cause circuit 504 to carry out the steps of the present invention when the program instructions are run by the circuit 504.

The memory 505 may also store data and useful information for carrying the steps of the present invention as described above.

The circuit 504 may be for instance:
a processor or a processing unit adapted to interpret instructions in a computer language, the processor or the processing unit may
comprise, may be associated with or be attached to a memory comprising the instructions, or
the association of a processor/processing unit and a memory, the processor or the processing unit adapted to interpret instructions in a computer language, the memory comprising said instructions, or
an electronic card wherein the steps of the invention are described within silicon, or a programmable electronic chip such as a FPGA chip (for «Field-Programmable Gate Array»).

This computer may comprise an input interface 503 for receiving a request for adding a new sink device to the plurality of sink devices of the point-to-multipoint Bluetooth network or for receiving a request for changing a value of a configuration parameter related to a sink device of the plurality of sink devices, and an output interface 506 for providing a new set of values of the configuration parameters.

To ease the interaction with the computer, a screen 501 and a keyboard 502 may be provided and connected to the computer circuit 504.

Furthermore, the block diagram represented in FIG. 1 is a typical example of a program which some instructions can be performed by the device described 500. FIG. 1 may thus correspond to the flowchart of the general algorithm of a computer program within the meaning of the invention.

In one embodiment of the invention the Bluetooth operation is conducted by a Bluetooth driver stored in a first section of the memory 505, while the operational parameters are determined with an operating system stored in a second section of memory 505. Additionally, the operating system may interface with one or more applications to determine one or more operational parameters, where the application is located in a third section of memory 505. This advantageously separation of these functions allows for independent development of each without the need to alter the other functions at the same time.

Of course, the present invention is not limited to the embodiments described above as examples. It extends to other variants and other situations than those presented above.

What is claimed is:

1. A method for managing a plurality of multimedia communication links in a point-to-multipoint Bluetooth network established between a source device and a plurality of sink devices, the method comprising:
determining an initial set of values of configuration parameters respectively related to each sink device of the plurality of sink devices;
determining an initial value of a maximum bandwidth usage parameter related to the point-to-multipoint Bluetooth network;
determining one or more types of codec supported by each sink device; and
determining, based at least in part on the one or more types of codec supported by each sink device, a new set of values of the configuration parameters different from the initial set of values, wherein
the new set of values is determined to allocate bandwidth usage values between the plurality of multimedia communication links without exceeding the value of the maximum bandwidth usage parameter.

2. The method of claim 1, wherein determining the new set of values of the configuration parameters is in response to a change in the point-to-multipoint Bluetooth network.

3. The method of claim 1, further comprising:
transmitting audio information to the sink devices of the plurality of sink devices over the respective multimedia communication links of the point-to-multipoint Bluetooth network based on the initial set of values of configuration parameters; and
transmitting audio information to the sink devices of the plurality of sink devices over the respective multimedia communication links of the point-to-multipoint Bluetooth network based on the new set of values.

4. The method of claim 1, wherein the configuration parameters comprise a multimedia configuration parameter, a Bluetooth connection parameter, or both.

5. The method of claim 4, wherein the configuration parameters comprise the multimedia configuration parameter selected from the group consisting of:
a type of codec,
a parameter relative to a codec,
a type of data,
an audio channel selection parameter, and
a sampling rate parameter.

6. The method of claim 4, wherein the configuration parameters comprise the Bluetooth connection parameter selected from the group consisting of:
a Flush Timeout parameter,
a channel type parameter,
a quality of service parameter,
a number of retransmission parameter,
a MTU parameter,
a packet type parameter, and
a Bluetooth Low Energy, BLE, link parameter.

7. The method of claim 1, wherein the bandwidth usage values are data rates, wherein the configuration parameters comprise, for each sink device of the plurality of sink devices, the one or more types of codec supported by the sink device, the method further comprising, for each sink device among the plurality of sink devices:
  determining a type of codec among the one or more types of codec supported by the sink device and a bitrate among a list of possible bitrates respectively associated to the type of codec, wherein
    a sum of the determined bitrates for all the sink devices of the plurality of sink devices is below a value of the maximum bandwidth usage parameter.

8. The method of claim 4, wherein:
the bandwidth usage values are numbers of available Bluetooth slots;
the configuration parameters comprise, for each sink device of the plurality of sink devices, the one or more types of codec supported by the sink device, and respective set of packet type parameters, and the method further comprises, for each sink device among the plurality of sink devices:
determining a type of codec among the one or more types of codec supported by the sink device and a bitrate among a list of possible bitrates respectively associated to the type of codec;
determining a packet type parameter among the respective set of packet type parameters; and
determining a number of Bluetooth slots based on the packet type parameter and the bitrate, wherein
  a sum of the numbers of Bluetooth slots determined for the plurality of sink devices is below a value of the maximum bandwidth usage parameter.

9. The method of claim 4, wherein the configuration parameters comprise, for each sink device of the plurality of sink devices:
a respective type of codec used for processing audio data to be transmitted to the sink device;
a respective bitrate associated to the type of codec; and
a respective audio channel parameter for playing an audio content corresponding to the audio data;
wherein the method further comprises:
  receiving, for each sink device of the plurality of sink devices, a respective spatial position information for the sink device relative to other sink devices of the plurality of sink devices; and
  receiving, for each sink device of the plurality of sink devices, a respective set of numbers of channels supported by the sink device.

10. The method of claim 9, further comprising:
for each sink device among the plurality of sink devices, determining, based on the spatial position information received for each sink device of the plurality of sink devices:
  a type of codec among the one or more types of codec supported by the sink device;
  a respective audio channel parameter, wherein the respective audio channel parameter is further determined based on a set of types of audio data supported by the sink device; and
  a bitrate among a list of possible bitrates respectively associated to the determined type of codec; and
for each sink device among the plurality of sink devices, determining a respective bandwidth usage value, based on the type of codec, the audio channel parameter and the bitrate, wherein
  a sum of the determined bandwidth usage values for all the sink devices of the plurality of sink devices is below a value of the maximum bandwidth usage parameter.

11. The method of claim 1, wherein the configuration parameters comprise, for at least one sink device of the plurality of sink devices, a parameter for stopping a transmission of data or payload to the sink device.

12. A Bluetooth device, comprising:
a Bluetooth chip,
a processor, and
a memory, the Bluetooth device being configured to:
  determine an initial set of values of configuration parameters respectively related to each sink device of a plurality of sink devices;
  determine an initial value of a maximum bandwidth usage parameter related to a point-to-multipoint Bluetooth network;
  determine one or more types of codec supported by each sink device of the plurality of sink devices; and
  determine, based at least in part on the one or more types of codec supported by each sink device, a new set of values of the configuration parameters different from the initial set of values, wherein
    the new set of values is determined to allocate bandwidth usage values between a plurality of multimedia communication links without exceeding the value of the maximum bandwidth usage parameter.

13. The Bluetooth device of claim 12, wherein determining the new set of values of the configuration parameters is in response to a change in the point-to-multipoint Bluetooth network.

14. The Bluetooth device of claim 12, wherein the Bluetooth device is further configured to:
transmit audio information to the plurality of sink devices over the respective multimedia communication links of the point-to-multipoint Bluetooth network based on the initial set of values of configuration parameters; and
transmit audio information to the plurality of sink devices over the respective multimedia communication links of the point-to-multipoint Bluetooth network based on the new set of values.

15. The Bluetooth device of claim 12, wherein the configuration parameters comprise a multimedia configuration parameter selected from the group consisting of:
a type of codec,
a parameter relative to a codec,
a type of data,
an audio channel selection parameter, and
a sampling rate parameter.

16. The Bluetooth device of claim 12, wherein the configuration parameters comprise a Bluetooth connection parameter selected from the group consisting of:
a Flush Timeout parameter,
a channel type parameter,
a quality of service parameter,
a number of retransmission parameter,
a MTU parameter,
a packet type parameter, and
a Bluetooth Low Energy, BLE, link parameter.

17. A non-transitory computer readable storage medium, having stored there on a computer program comprising program instructions, the computer program being loadable into a data-processing unit and adapted to cause the data-processing unit to perform a method, comprising:

determining an initial set of values of configuration parameters respectively related to each sink device of a plurality of sink devices;

determining an initial value of a maximum bandwidth usage parameter related to a point-to-multipoint Bluetooth network;

determining one or more types of codec supported by each sink device; and determining, based at least in part on the one or more types of codec supported by each sink device, a new set of values of the configuration parameters different from the initial set of values, wherein the new set of values is determined to allocate bandwidth usage values between a plurality of multimedia communication links without exceeding the value of the maximum bandwidth usage parameter.

18. The non-transitory computer readable storage medium of claim 17, wherein determining the new set of values of the configuration parameters is in response to a change in the point-to-multipoint Bluetooth network.

19. The non-transitory computer readable storage medium of claim 17, wherein the method performed by the data-processing unit further comprises:

causing transmission of audio information to the plurality of sink devices over the respective multimedia communication links of the point-to-multipoint Bluetooth network based on the initial set of values of configuration parameters; and causing transmission of audio information to the plurality of sink devices over the respective multimedia communication links of the point-to-multipoint Bluetooth network based on the new set of values.

20. The non-transitory computer readable storage medium of claim 17, wherein the configuration parameters comprise a multimedia configuration parameter selected from the group consisting of:

a type of codec,
a parameter relative to a codec,
a type of data,
an audio channel selection parameter, and
a sampling rate parameter.

* * * * *